June 14, 1960    L. M. HUGHES    2,941,141
HALF-WAVE MAGNETIC AMPLIFIER
Filed Nov. 30, 1956
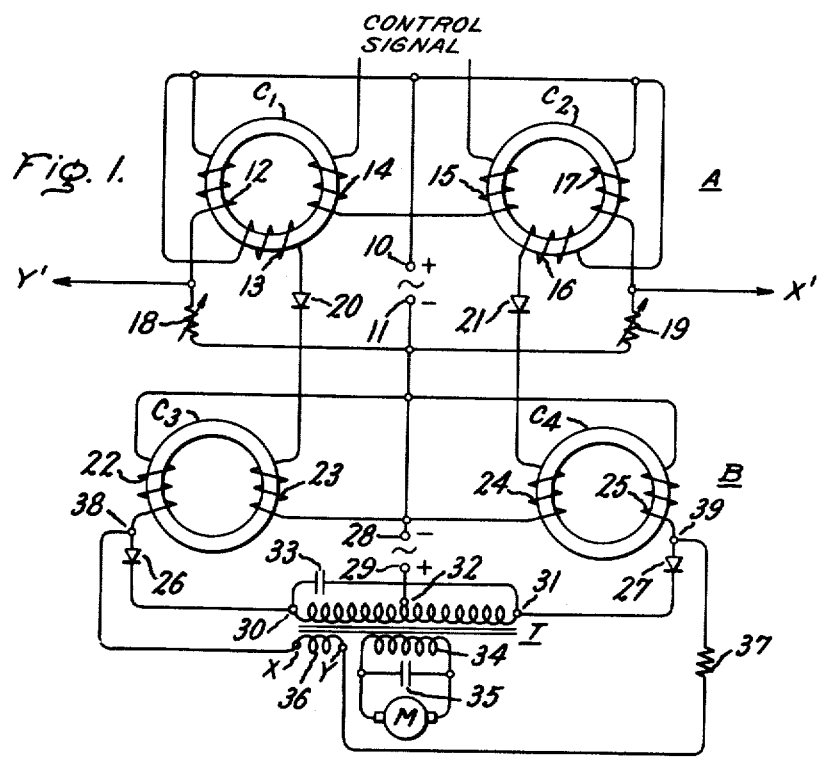
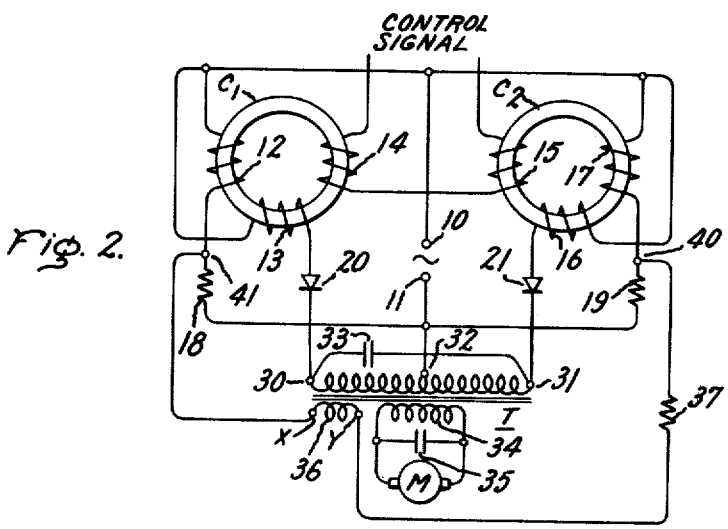
Inventor:
Lawrence M. Hughes,
by Roe D. McBurnett
His Attorney.

United States Patent Office 2,941,141
Patented June 14, 1960

2,941,141

HALF-WAVE MAGNETIC AMPLIFIER

Lawrence M. Hughes, Scotia, N.Y., assignor to General Electric Company, a corporation of New York Filed Nov. 30, 1956, Ser. No. 625,430

8 Claims. (Cl. 323—89)

This invention relates to electrical amplifier systems and more particularly to such systems employing half-wave magnetic amplifiers of the saturable core reactor type.

It is well known in the art to make use of conventional full bridge half-wave magnetic amplifier circuits which employ two cores per stage having two load windings per core. These circuits also use four rectifiers in the load portion of the circuit. Each stage employs separate reference windings. It has been found necessary in many applications of magnetic amplifier circuits, for instance in the aircraft industry, to reduce the size and weight of all equipment as much as possible. This reduction in size and weight must be effected while, at the same time, reliability is maintained or improved.

An object of this invention is to provide an improved magnetic amplifier which is durable, light in weight, and low in cost.

Another object of my invention is to reduce the number of windings and rectifiers necessary in a multistage half-wave magnetic amplifier.

A further object of my invention is to eliminate reference windings in succeeding stages of amplification in a magnetic amplifier.

A still further object of my invention is to provide a magnetic amplifier with a feedback proportional to load conditions, such as motor velocity and torque within a single stage if desired.

Further objects and advantages of my invention will become apparent upon referring to the attached specification and claims.

In carrying out my invention in one form thereof, a two-stage magnetic amplifier, having two closed magnetic paths or cores per stage, employs a first stage in which the load windings feed the control windings of the second stage differentially and a second stage in which the load windings are differentially connected to an output circuit, including a transformer. A degenerative feedback signal is derived from a separate winding on the output transformer and may be fed back to any two corresponding windings on opposite cores in any stage desired. The circulating currents through the load windings of the first stage and through the control windings of the second stage serve to reference the second stage and eliminate the necessity for second stage reference windings.

In another form of my invention a degenerative feedback signal is derived from a separate winding on the output transformer and fed back to corresponding windings on different magnetic cores.

Fig. 1 is a circuit diagram illustrating an embodiment of my invention wherein both feedback and reference windings are eliminated.

Fig. 2 is a circuit diagram illustrating a feature of my invention wherein degenerative feedback is applied to a stage of amplification.

Referring now to the figures, in Fig. 1 a first source of alternating potential is applied across a first circuit means comprising the terminals 10 and 11 to a first stage of amplification A. This stage employs two closed magnetic paths or cores $C_1$ and $C_2$ illustrated as closed rings. On the core $C_1$ there are three windings: a reference winding 12, a load winding 13, and a control winding 14. On the core $C_2$ there are also three windings: a control winding 15, a load winding 16, and a reference winding 17. The reference winding 12 on core $C_1$ is connected in series with a variable resistance 18 across the terminals 10 and 11. The reference winding 17 on core $C_2$ is connected in series with a variable resistance 19 also across the terminals 10 and 11. The control windings 14 and 15 of stage A are shown connected in the customary push-pull manner. Load winding 13 on core $C_1$ is connected in series with one of a first pair of unidirectional impedances or rectifiers 20, and load winding 16 on core $C_2$ is connected in series with a similar unidirectional impedance or rectifier 21.

A second stage of amplification B employs the cores $C_3$ and $C_4$, illustrated as closed rings, the core $C_3$ having load winding 22 and reference and control winding 23, and the core $C_4$ having reference and control winding 24 and load winding 25 wound thereon. The load winding 22 on core $C_3$ is connected in series with one of a second pair of unidirectional impedances or rectifiers 26 and the load winding 25 on core $C_4$ is connected in series with a similar unidirectional impedance or rectifier 27.

The control circuitry of stage B employs two parallel paths connected across the first circuit means at terminals 10 and 11. The first such path contains the stage A load winding 13 in series with rectifier 20 and in series with control winding 23 of stage B. The second parallel path consists of the load winding 16 of stage A in series with rectifier 21 and control winding 24 of stage B. A second source of alternating potential is connected across a second circuit means to stage B from the terminal 28, which is connected to the terminal 11 in stage A, to a terminal 29. This makes the second source of opposite polarity with respect to stage B than the first source is with respect to stage A.

The output circuit for stage B contains a transformer T having a primary winding with terminals 30 and 31 at its extremities. The primary is tapped at the point 32. This would ordinarily be a center tap but in an application where motor torque is different in the two directions it need not be. A tuning capacitor 33 is connected across the primary at 30 and 31. A secondary winding 34 of transformer T is connected across a load, here shown to be a motor M. A second tuning capacitor 35 may be connected across the motor.

The output circuit is connected to stage B in the following manner: Load winding 22 on core $C_3$ is connected from terminal 28 in series with the rectifier 26 to terminal 30 on one extremity of the primary of transformer T. The second load winding 25 of stage B is similarly connected from terminal 28 in series with rectifier 27 to terminal 31 at the other extremity of the primary. The tap 32 on the transformer primary is connected to terminal 29.

In order to derive a feedback voltage to prevent saturation due to direct current in the load circuit, I have provided an additional winding 36, having extremities X and Y, on the transformer T. Winding 36 may be connected in series with a resistance 37 across the points 38 and 39, the point 38 being located between load winding 22 and rectifier 26, and the point 39 being located between load winding 25 and rectifier 27. The purpose of this resistor 37 is to insure that the resistance of the circuit path between points 38 and 39 through the transformer is greater than the resistance of the circuit path between these points through the windings 22 and 25. It will be appreciated that internal transformer resistance may be sufficient for this purpose and that a separate resistor is not essential to my invention. Alternatively, the extremities X and Y of winding 36 could be connected to stage A with a change in polarity, for instance at the points X' and Y' below reference windings 17 and 12 as illustrated.

The mode of operation of this circuit is as follows: With no signal applied to the control windings 14 and 15 of stage A, the cores $C_1$ and $C_2$ saturate at approximately the same time due to the magnetomotive forces set up in them by reference windings 12 and 17 and load windings 13 and 16. During the portion of the cycle when both $C_1$ and $C_2$ are saturated, a null or circulating current flows through the two parallel paths. One path comprises the load winding 13, the rectifier 20 and the control winding 23; and the other path comprises the load winding 16, the rectifier 21, and the control winding 24. This circulating current, of equal magnitude through the control windings 23 and 24 of stage B, may, in accordance with my invention, be utilized as a reference or flux setting current and the need for separate reference windings on stage B obviated. Since the polarity of the first source is opposite to that of the second source with respect to their respective stages of amplification, saturation of cores $C_1$ and $C_2$ in stage A will occur at a time when cores $C_3$ and $C_4$ in stage B are unsaturated. This condition causes the null or circulating current from stage A to circulate in the control windings 23 and 24 of stage B during the flux setting period of stage B, and this current may be adapted to perform the function of referencing stage B, thus setting the firing angle, or the point at which stage B normally saturates without any signal applied.

When a control signal is fed to the control windings 14 and 15 of stage A during the period when cores $C_1$ and $C_2$ are not saturated, one of the cores, for example $C_1$, will be driven toward saturation and the other core $C_2$ will be driven away from saturation. The equal magnetomotive forces applied to the cores by the load windings 13 and 16 will saturate $C_1$ and $C_2$ at different times, the core $C_1$ saturating first and $C_2$ later on in the cycle. When $C_1$ saturates, a substantially increased current will flow through load winding 13, rectifier 20 and control winding 23. This current will constitute a control signal for stage B superimposed on the reference signal previously described. When core $C_2$ saturates, a similar current will flow through load winding 16, rectifier 21, and control winding 24 which will tend to cancel the effect in stage B of the signal applied to control winding 23. This type of circuitry provides a differential control for stage B, the effective control signal being the difference in the currents flowing in control windings 23 and 24 which oppose their respective load windings 22 and 25, as illustrated by the polarity markings, and which in effect will buck one another out. The control signal just described will cause the core $C_4$ to saturate before core $C_3$ in stage B in a manner similar to that described above. Thus a greater current will flow through load winding 25, rectifier 27, and the half of the output transformer primary from 31 to 32 than will flow through the load winding 22, rectifier 26 and the half of the output transformer primary from 30 to 32; and as a result a differential output voltage will be applied to the motor M through the transformer T.

The winding 36 on transformer T is used to feed back a signal through resistance 37 and through the windings 22 and 25 in stage B, yielding a degenerative feedback. This signal is inherently proportional to motor velocity and torque and this circuitry replaces the need for a tachometer or other relatively heavy and expensive velocity signal generator in an amplifier of this type. Given the desired polarity, this signal may also alternatively be fed back to stage A as illustrated, and as described supra.

It can be seen that in Fig. 1 I have illustrated circuitry employing my invention which will permit the elimination of reference windings in the second stage reducing the weight of the amplifier and eliminating the resistances which would be in series with the reference windings in the second stage. The reduction in the number of windings also reduces the number of necessary connections in the amplifier which tends to increase the reliability of the unit. This circuit will also allow the use of direct feedback, within one stage if desired or alternatively within two stages, which feedback will replace the need for a tachometer or other velocity signal generator, yielding a signal proportional to motor velocity. The circuit is still adjustable and the firing angle of the second stage may be adjusted by adjusting the firing angle of the first stage without changing the gain, the amplification of this circuit being independent of the firing angle. This circuit will yield a power amplification of 1,000 or more.

It will be apparent to anyone skilled in the art that the feedback feature shown in the Fig. 1 circuit need not be employed in certain applications and that an alternative embodiment of my invention could comprise this circuit with the feedback circuitry eliminated.

Referring now to Fig. 2, I have shown one stage of amplification employing a magnetic core $C_1$ having a reference winding 12, a load winding 13, and a control winding 14 wound thereon. Core $C_2$ has a control winding 15, a load winding 16, and a reference winding 17 wound on it. A source of alternating potential is applied across this stage at the terminals 10 and 11. The reference winding 12 on core $C_1$ is connected in series with a resistance 18 across the source of alternating potential at terminals 10 and 11. The reference winding 17 on core $C_2$ is connected in series with a resistance 19 also across the source of alternating potential at terminals 10 and 11. Control windings 14 and 15 are shown connected in the customary push-pull manner. A unidirectional impedance or rectifier 20 is connected in series with the load winding 13 of core $C_1$ and a rectifier 21 is connected in series with the load winding 16 of core $C_2$.

The load circuit for this stage employs a transformer T with a primary having extremities 30 and 31 and a tap at the point 32. The load winding 13 on core $C_1$ is connected from the terminal 10 in series with rectifier 20 to one extremity 30 on the primary of transformer T. Load winding 16 on core $C_2$ is connected from terminal 10 in series with rectifier 21 to the other extremity 31 of the primary. The tap 32 on the primary is connected to terminal 11. A phasing capacitor 33 is connected across the transformer primary. A secondary winding 34 on the transformer T is connected across the load, here shown to be a motor M. A second phasing capacitor 35 may also be connected across the motor. An additional winding 36, for feedback, on the transformer T is connected in series with a resistance 37 to the points 40 and 41, the point 40 being between the reference winding 17 and the impedance 19 and the point 41 being between the reference winding 12 and the impedance 18.

The operation of this circuit is as follows: With no control signal applied to the control windings 14 and 15, the cores $C_1$ and $C_2$ saturate at the same time due to the magnetomotive forces set up in them by the reference windings 12 and 17 and the load windings 13 and 16. Equal currents will flow through the parallel paths comprising load winding 13, rectifier 20 and one part of the transformer primary 30 to 32 and through load winding 16, rectifier 21 and the other portion of the transformer primary 31 to 32. No signal will appear across the secondary 34 of transformer T. When a control signal is fed to windings 14 and 15, one of the cores, for example $C_1$, will be driven away from saturation and the other core $C_2$ will be driven toward saturation. Thus the magnetomotive forces set up in the cores by load windings 13 and 16 will saturate the core $C_2$ before the core $C_1$ and the parallel path comprising load winding 16, rectifier 21 and transformer primary section 31 to 32 will conduct current first, core $C_2$ saturating before $C_1$. During one portion of the cycle, only this side of the stage will conduct appreciable current and an output will appear across the transformer secondary 34. When $C_1$ saturates, the voltages applied to the two sections of the primary will cancel one another out on the secondary 34 and no output will appear. Feedback winding 36 will detect a signal proportional to motor velocity which is fed back through the reference windings 12 and 17 degeneratively. This signal may be used to replace a signal from a more expensive and weighty device, such as a tachometer, in this type of circuit.

The Fig. 2 circuit has the obvious advantage of the utilization of a feedback signal proportional to motor velocity within one stage of amplification employing extremely simple circuitry, which will tend to reduce the weight and size of the amplifier and associated equipment.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A half-wave magnetic amplifier comprising a first electric circuit means for the connection of a first source of alternating potential; a first stage of amplification having a first two closed magnetic paths, each of said first paths having a first control winding, a first load winding and a reference winding wound thereon, said reference windings each being in series with a resistance across said first circuit means; a first pair of unidirectional impedances, said first load windings each being in series with a different one of said first pair of unidirectional impedances, and said first pair of unidirectional impedances being poled in the same direction with respect to said first circuit means; a second electric circuit means for the connection of a second source of alternating potential; a second stage of amplification having a second two closed magnetic paths, each of said second paths having a second control winding and a second load winding wound thereon; a second pair of unidirectional impedances, said second load windings each being in series with a different one of said second pair of unidirectional impedances, said second pair of unidirectional impedances being poled in the same direction with respect to said second circuit means, and said second circuit means being connected to said second source poled oppositely with respect to said second stage than said first circuit means is with respect to said first stage when connected to said first source; a control circuit for said second stage, said second control windings each being connected in series with a different one of said first load windings and corresponding one of said first pair of unidirectional impedances across said first circuit means, whereby the null circulating currents through said first load windings and said second control windings will serve to reference said second stage; a transformer for driving a load, said transformer having a tapped primary winding, said second load windings and corresponding ones of said second pair of unidirectional impedances each being connected in series from one side of said second circuit means to a different extremity of said primary winding of said transformer, and said tap on said primary winding being connected to the other side of said second circuit means; and a second winding on said transformer in series with a resistance connected to corresponding windings on different magnetic paths in one of said stages whereby degenerative feedback is provided.

2. In combination, a first electric circuit means for the connection of a first source of alternating potential; a first stage of amplification having a first two closed magnetic cores, each of said first cores having a first control winding, a first load winding and a reference winding wound thereon, said reference windings each being in series with a resistance across said first source; a first pair of unidirectional impedances, said first load windings each being in series with a different one of said first pair of unidirectional impedances, said first pair of unidirectional impedances being poled in the same direction with respect to said first circuit means; a second circuit means for the connection of a second source of alternating potential; a second stage of amplification having a second two closed magnetic cores, each of said second cores having a second control winding and a second load winding wound thereon; a second pair of unidirectional impedances, said second load windings each being in series with a different one of said second pair of unidirectional impedances and said second pair of unidirectional impedances being poled in the same direction with respect to said second circuit means, said second circuit means being connected to said second source poled oppositely with respect to said second stage than said first circuit means is with respect to said first stage when connected to said first source; a control circuit for said second stage, said second control windings each being connected in series with a different one of said first load windings and corresponding one of said first pair of unidirectional impedances across said first circuit means, whereby the null circulating currents through said first load windings and said second control windings serve to reference said second stage; and a load circuit, said second load windings and series corresponding one of said second pair of unidirectional impedances each being connected in parallel from one side of said second circuit means through said load circuit, to the other side of said second circuit means.

3. The combination of claim 2 in which said load circuit has a tap thereon, said second load windings and series unidirectional impedances each being connected from one side of said second circuit means to a different extremity of said load circuit and said tap on said load circuit being connected to the other side of said second circuit means.

4. In combination, electric circuit means adapted to be connected to a source of alternating potential; a stage of amplification having two closed magnetic cores, each of said cores having a control winding, a load winding and a reference winding wound thereon, said reference windings each being in series with a resistance across said circuit means and said load windings each being in series with a rectifier, said rectifiers being poled in the same direction with respect to said circuit means; a transformer for driving a load, said transformer having a tapped primary winding, said load windings and series rectifiers each being connected from one side of said circuit means to a different extremity of said primary of said transformer, and said tap on said primary being connected to the other side of said circuit means; and a second winding on said transformer in series with a resistance, opposite sides of the series circuit including said second winding and series resistance being connected to corresponding windings on different magnetic cores in said stage whereby degenerative feedback is provided.

5. The combination of claim 4 in which said corresponding windings on different magnetic cores comprise said reference windings.

6. A multistage half-wave magnetic amplifier comprising in combination, a first stage of amplification having a first two closed magnetic cores each having a first control winding, a first load winding and a reference winding wound thereon; a first circuit means for the connection of a first source of alternating potential connected across said first stage; a first pair of unidirectional impedances; a second stage of amplification having a second two closed magnetic cores each having a second control winding and a second load winding wound thereon; a second circuit means for the connection of a second source of alternating potential connected across said second stage in the opposite polarity to that of said first source with respect to said first stage when connected to said first circuit means; a control and reference circuit for said second stage having two parallel branches connected across said first circuit means each consisting of a different one of said first load windings in series with a different one of said second control windings and a different one of said first pair of undirectional impedances; a second pair of unidirectional impedances; a transformer having a tapped primary; a load circuit for said second stage having two parallel branches connected across said second circuit means each containing a different one of said second load windings in series with a different one of said second pair of unidirectional impedances and a different half of the tapped primary of said transformer, the tap being connected to one side of said second circuit means; and a second winding on said transformer in series with a resistance, opposite sides of the series circuit including said second winding and series resistance being connected to corresponding windings on different magnetic cores in one of said stages in order to apply a degenerative feedback thereto.

7. In combination, electric circuit means adapted to be connected to a source of alternating potential and a stage of magnetic amplification comprising: magnetic core means including at least two closed magnetic paths, control and load windings wound on each of the paths of said magnetic core means, a unidirectional device in series with each of said load windings, said devices being poled in the same direction with respect to said circuit means, a transformer adapted for supplying power to a load, said transformer having a tapped primary winding, said load windings and series unidirectional devices each being connected from one side of said circuit means to a different extremity of said primary winding of the transformer, and the tap on said primary winding being connected to the other side of said circuit means; and a second winding on said transformer, opposite sides of said second winding being connected to corresponding windings on different paths of said core means in said stage of amplification whereby degenerative feedback is provided.

8. In combination, electric circuit means adapted to be connected to a source of alternating potential and a stage of magnetic amplification comprising: magnetic core means including at least two closed magnetic paths, control and load windings wound on each of the paths of said magnetic core means, means for providing unidirectional current in each of said load windings in the same direction with respect to said circuit means, a transformer adapted for supplying power to a load, said transformer having a tapped primary winding, said load windings each being connected from one side of said circuit means to a different extremity of said primary winding of the transformer, and the tap on said primary winding being connected to the other side of said circuit means; and a second winding on said transformer, opposite sides of said second winding being connected to corresponding windings on different paths of said core means in said stage of amplification whereby degenerative feedback is provided.

References Cited in the file of this patent

UNITED STATES PATENTS 2,849,544     Herz et al. _____ Aug. 26, 1958